US012012913B2

(12) United States Patent
Koeberlein et al.

(10) Patent No.: US 12,012,913 B2
(45) Date of Patent: Jun. 18, 2024

(54) FUEL SYSTEM COVER FOR AN INTERNAL COMBUSTION ENGINE

(71) Applicant: Cummins Inc., Columbus, IN (US)

(72) Inventors: Edward D. Koeberlein, Columbus, IN (US); David M. Barnes, Columbus, IN (US); Michael T. Stanley, Seymour, IN (US)

(73) Assignee: Cummins Inc., Columbus, IN (US)

( * ) Notice: Subject to any disclaimer, the term of this patent is extended or adjusted under 35 U.S.C. 154(b) by 100 days.

(21) Appl. No.: 18/053,952

(22) Filed: Nov. 9, 2022

(65) Prior Publication Data

US 2023/0143650 A1 May 11, 2023

Related U.S. Application Data

(60) Provisional application No. 63/263,831, filed on Nov. 10, 2021.

(51) Int. Cl.

| | |
|---|---|
| ***F02M 55/02*** | (2006.01) |
| ***F02M 37/00*** | (2006.01) |
| ***F02M 61/14*** | (2006.01) |
| ***F02M 65/00*** | (2006.01) |

(52) U.S. Cl.

CPC .... *F02M 37/0052* (2013.01); *F02M 37/0017* (2013.01); *F02M 37/0047* (2013.01); *F02M 55/025* (2013.01); *F02M 61/14* (2013.01); *F02M 65/006* (2013.01); *F02M 2200/16* (2013.01); *F02M 2200/18* (2013.01); *F02M 2200/857* (2013.01)

(58) Field of Classification Search

CPC ........... F02M 37/0011; F02M 37/0017; F02M 37/0047; F02M 51/00; F02M 55/00; F02M 55/025; F02M 55/004; F02M 61/14; F02M 61/16; F02M 65/006; F02M 69/00; F02M 69/465; F02M 2200/16; F02M 2200/18; F02M 2200/85; F02M 2200/857

USPC .......................... 123/195 C, 198 E, 467, 468

See application file for complete search history.

(56) References Cited

U.S. PATENT DOCUMENTS

| | | | | |
|---|---|---|---|---|
| 4,149,568 A | | 4/1979 | Kuntz et al. | |
| 4,384,557 A | | 5/1983 | Johnson | |
| 4,669,443 A | * | 6/1987 | Oetting | F02P 7/02 123/647 |
| 4,757,789 A | * | 7/1988 | Laine | F02M 61/145 123/193.5 |
| 5,261,375 A | * | 11/1993 | Rush | F02M 35/10354 123/456 |
| 5,325,834 A | * | 7/1994 | Ballheimer | F02M 59/105 123/456 |

(Continued)

FOREIGN PATENT DOCUMENTS

| | | |
|---|---|---|
| DE | 102015014270 A1 | 5/2016 |

OTHER PUBLICATIONS

European Extended Search Report, EP Appln. No. 22206592.2, Apr. 5, 2023, 7 pgs.

*Primary Examiner* — Erick R Solis

(74) *Attorney, Agent, or Firm* — Taft, Stettinius & Hollister LLP

(57) ABSTRACT

A fuel system cover is provided for an internal combustion engine. The fuel system cover is configured to be mounted on the cylinder head assembly to encapsulate a portion of the fuel system to provide leak prevention, mitigation, and detection capabilities.

19 Claims, 6 Drawing Sheets

(56) References Cited

U.S. PATENT DOCUMENTS

| | | | | |
|---|---|---|---|---|
| 5,392,749 | A * | 2/1995 | Stockner | F02M 57/025 123/456 |
| 5,499,612 | A * | 3/1996 | Haughney | F02M 63/00 123/470 |
| 5,533,485 | A * | 7/1996 | Bronkal | F02M 69/465 123/456 |
| 5,577,480 | A * | 11/1996 | Gmelin | F02M 61/145 123/472 |
| 5,746,168 | A * | 5/1998 | Lochbrunner | F02M 51/005 439/130 |
| 6,237,569 | B1 * | 5/2001 | Stelzer | F02M 55/025 123/456 |
| 6,269,796 | B1 * | 8/2001 | Mitchell | F02M 59/105 123/468 |
| 6,394,071 | B2 * | 5/2002 | Nitta | F02M 55/025 123/456 |
| 6,732,717 | B2 | 5/2004 | Braun et al. | |
| 6,817,337 | B1 * | 11/2004 | Siring | F02M 35/10242 123/195 A |
| 6,827,065 | B2 | 12/2004 | Gottemoller et al. | |
| 6,880,528 | B2 * | 4/2005 | Klugl | F02M 63/0225 123/468 |
| 8,028,673 | B2 | 10/2011 | Olsen et al. | |
| 8,844,500 | B2 | 9/2014 | Bedekar et al. | |
| 8,997,715 | B2 | 4/2015 | Worthington et al. | |
| 11,028,811 | B2 * | 6/2021 | Brun | B60K 6/26 |
| 2011/0073074 | A1 * | 3/2011 | Hay | F02M 55/025 123/193.5 |
| 2012/0037121 | A1 | 2/2012 | Kajita et al. | |
| 2016/0319786 | A1 * | 11/2016 | Millet | F02F 11/002 |

* cited by examiner

FUEL SYSTEM COVER FOR AN INTERNAL COMBUSTION ENGINE

CROSS-REFERENCE TO RELATED APPLICATION

The present application claims the benefit of the filing date of U.S. Provisional App. Ser. No. 63/263,831 filed on Nov. 10, 2021, which is incorporated herein by reference.

FIELD OF THE INVENTION

This invention relates to fuel systems for internal combustion engines, and more particularly to fuel system covers for internal combustion engines.

BACKGROUND

Fuel rails, lines, fittings, couplings, and other components are provided on internal combustion engines to provide fuel to one or more cylinders of the engine for combustion. These components may develop leaks or otherwise fail over time, which may cause the fuel to leak into the environment. This can be particularly problematic in certain environments, such as marine environments. Current solutions include providing double wall components so that redundant protection from failure of the component is provided. Other solutions include providing different configuration requirements for the fuel system components, such as an increased bend radius.

However, these solutions require using different components for the engine depending on whether or not the engine is to be used in an application that requires special protection from fuel leakage. In addition, special fuel leak detection equipment can impose additional costs to these systems. Therefore, further improvements in fuel leak prevention, mitigation, and detection for internal combustion engines are needed.

SUMMARY

Embodiments include an internal combustion engine with a cylinder head assembly. The cylinder head assembly extends between a rearward end and a forward end. a fuel system includes a portion extending externally along the cylinder head assembly. A fuel system cover is mounted to the cylinder head assembly. The fuel system cover encapsulates the portion of the fuel system that extends externally along the cylinder head assembly.

In an embodiment, a fuel system cover for a fuel system of an internal combustion engine is disclosed. The fuel system cover includes a housing defining an interior chamber configured to house at least part of a fuel system. The housing includes a first side wall forming an opening into the interior chamber. The first side wall is configured to mount to a cylinder head assembly of the internal combustion engine. The housing also includes a second side wall opposite the first side wall, a top wall and an opposite bottom wall each extending between the first and second side walls, and a front end wall and an opposite rear end wall. The first and second side walls and the top and bottom walls each extend between the front and rear end walls.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
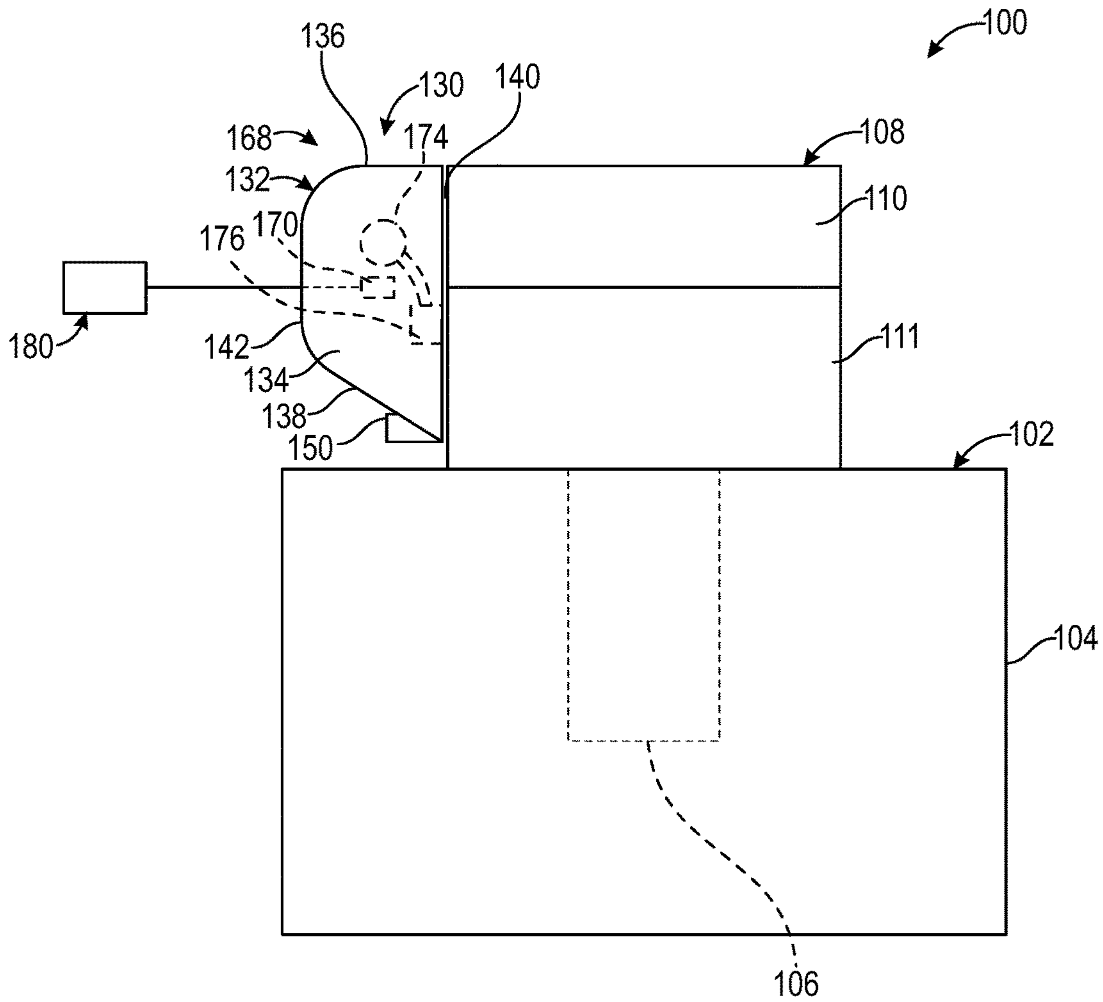
FIG. 1 is a schematic elevation view of an internal combustion engine and a fuel system cover of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIGS. 1-8, there is shown an internal combustion engine system 100. Internal combustion engine system 100 includes an internal combustion engine 102, 102' including a cylinder head assembly 108. The cylinder head assembly 108 extends between a rearward end 122 and an opposite forward end 120. A fuel system 168 includes a portion 170 extending externally along the cylinder head assembly 108. A fuel system cover 130, 130' is mounted to the cylinder head assembly 108. The fuel system cover 130, 130' encapsulates the portion 170 of the fuel system 168 extending externally along the cylinder head assembly 108.

There is further shown a fuel system cover 130, 130' for a fuel system 168 of an internal combustion engine 102, 102'. The fuel system cover 130, 130' includes a housing 132 defining an interior chamber 134 configured to house at least part of a fuel system 168. The housing 132 includes a first side wall 140, 140' forming an opening 148 into the interior chamber 134. The first side wall 140, 140' is configured to mount to a cylinder head assembly 108 of the internal combustion engine 102. The housing 132 also includes a second side wall 142, 142' opposite the first side wall 140, 140. Housing 132 includes a top wall 136, 136' and an opposite bottom wall 138, 138' each extending between the first side wall 140, 140' and second side wall 142, 142', and a front end wall 144, 144' and an opposite rear end wall 146, 146'. The first side wall 140, 140', the second side wall 142, 142', the top wall 136, 136, and the bottom wall 138, 138' each extend between the front end wall 144, 144' and the rear end wall 146, 146'.

Referring to FIG. 1, an internal combustion engine system 100 is shown that includes an internal combustion engine 102 and a fuel system 168. Internal combustion engine 102 includes a block 104 housing a plurality of components such as a crankshaft, a crankcase, and a plurality of cylinders associated with a cylinder bank 106. Internal combustion engine 102 further includes a cylinder head assembly 108 mounted on block 104. Cylinder head assembly 108 includes a valve cover 110 on a cylinder head 111, and valve cover 110 extends from rearward end 122 of cylinder head assembly 108 to forward end 120.

A fuel system cover 130 is mounted to the cylinder head assembly 108. The fuel system cover 130 can be mounted to only valve cover 110, to only cylinder head 111, or to both valve cover 110 and cylinder head 111. A portion 170 of a fuel system 168 that is exterior of cylinder head assembly 108 is shown that is encapsulated by fuel system cover 130. The fuel system portion 170 is connected between a fuel supply (not shown) and one or more injectors (not shown) within cylinder head assembly 108 that provide fuel for combustion within the cylinders of cylinder bank 106.

Figure 2:
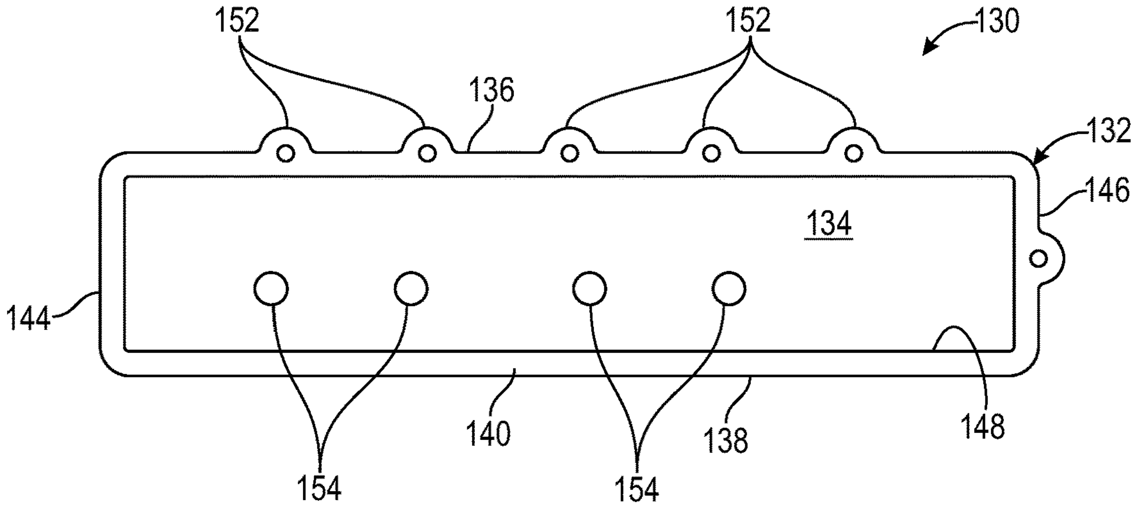
FIG. 2 is a schematic elevation view of the fuel system cover of FIG. 1 looking at a side of the fuel system cover mountable to the internal combustion engine.

Referring further to FIG. 2, fuel system cover 130 includes an elongated housing 132 that forms a chamber 134 for receiving the fuel system portion 170 along the exterior side of cylinder head assembly 108. Housing 132 includes a top wall 136, a bottom wall 138 opposite top wall 136, a first side wall 140, and a second side wall 142 opposite first side wall 140. Top wall 136, bottom wall 138, first side wall 140, and second side wall 142 extend between a front end wall 144 and an opposite rear end wall 146.

The walls 136, 138, 140, 142, 144, 146 extend around the chamber 134. First side wall 140 defines an opening 148 that is in communication with chamber 134. First side wall 140 is positioned against and engaged to at least one of the valve cover 110 and cylinder head 111 with a plurality of fasteners 150. The fuel system portion 170 is thereafter encapsulated in chamber 134 within housing 132 while housing 132 provides an enclosed environment around the fuel system portion 170 to capture any leaks therefrom.

In an embodiment, top wall 136 is outwardly convexly rounded between side walls 140, 142. Bottom wall 138 is sloped toward top wall 136 from first side wall 140 to second side wall 142. Other embodiments contemplate other shapes for walls 136, 138 depending on the engine packaging, external components, and space requirements. The junction of top wall 136 and first side wall 140 may include a plurality of tabs 152 with openings for receiving fasteners 150 to secure fuel system cover 130 to cylinder head assembly 108. Second side wall 142 and/or bottom wall 138 may include openings 154 for receiving fasteners 150 to secure fuel system cover 130 to cylinder head 111. Tabs and/or openings may also be provided at the junction of bottom wall 138 and first side wall 140, and/or along front end wall 144 and rear end wall 146, for receiving fasteners.

Figure 3:
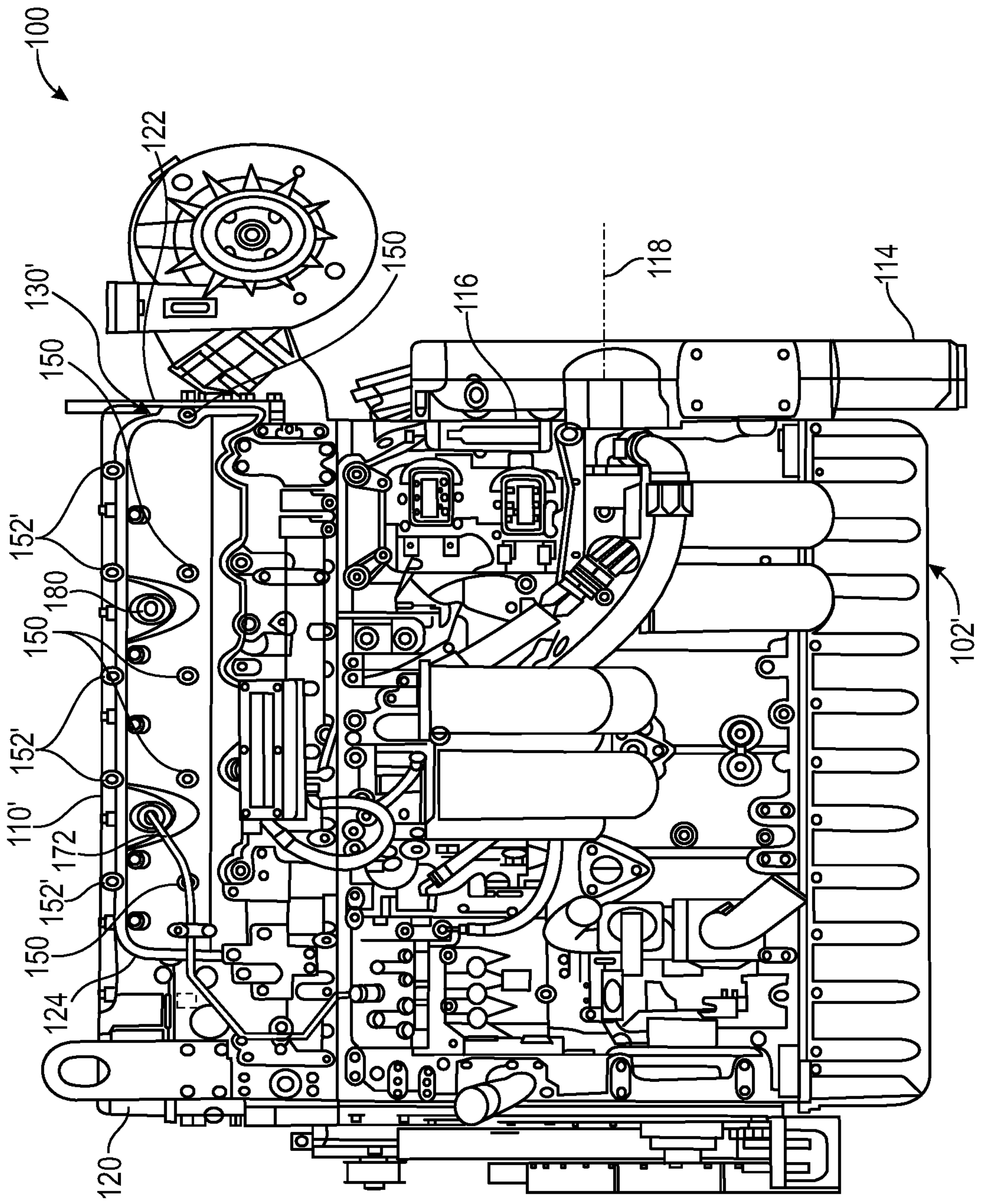
FIG. 3 is an elevation view of the internal combustion engine and fuel system cover of the present disclosure.
Figure 4:
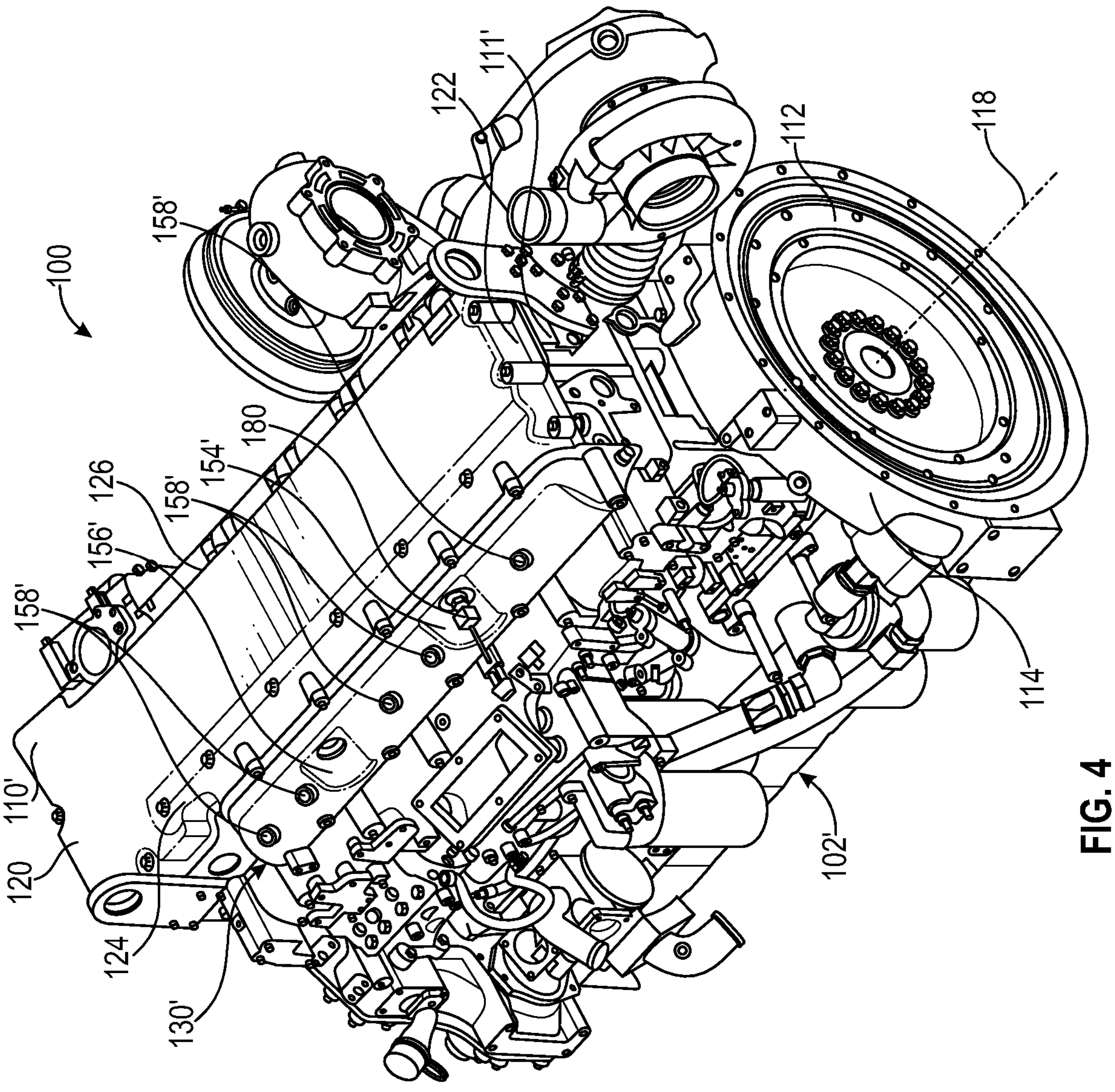
FIG. 4 is a perspective view of an embodiment of an internal combustion engine with an embodiment of the fuel system cover of FIG. 3.

Referring to FIGS. 3-4, an embodiment of system 100 is shown with an internal combustion engine 102'. Engine 102' extends along and defines a longitudinal axis 118 that is, or is parallel to, a rotational axis of flywheel 112 and/or the rotational axis of the crankshaft. Flywheel 112 is located in a flywheel housing 114 on a rearward end 116 of the internal combustion engine 102'. Other components are also contemplated but not illustrated, such as pistons, gears, pumps, housings, turbines, etc. that would normally be found on an internal combustion engine. The internal combustion engine 102' may be any type of internal combustion engine that requires a fuel system, including at least a diesel, gasoline, hydrogen, or natural gas engine, and/or combinations thereof.

The valve cover 110' extends along longitudinal axis 118 from a forward end 120 to a rearward end 122 that is oriented toward flywheel 112. Sides 124, 26 of valve cover 110' extend along axis 118 between the forward and rearward ends 120, 122 of valve cover 110'. An embodiment of fuel system cover 130, designated as fuel system cover 130', is mounted to side 124 of valve cover 110' and is also elongated along the longitudinal axis 118. Fuel system cover 130' can include features like fuel system cover 130 discussed above, such as a housing 132 with an interior chamber 34 for receiving fuel system portion 170, and the same or similar features may not be re-described herein for brevity.

Fuel system cover 130' includes a fuel inlet or fuel supply line 172 extending therethrough for connection exteriorly to the fuel supply (not shown). In an embodiment, the encapsulated fuel system portion 170 includes a fuel rail 174 connected to fuel supply line 172, and injector lines 176 for connection to injectors (not shown) located within the cylinder head assembly 108, such as shown in FIG. 1. Fuel system cover 130' also includes a fuel leak sensor 180, such as a pressure sensor, extending therethrough that is operable to detect a fuel leak from the portion 170 of the fuel system located within the fuel system cover 130'.

Figure 5:
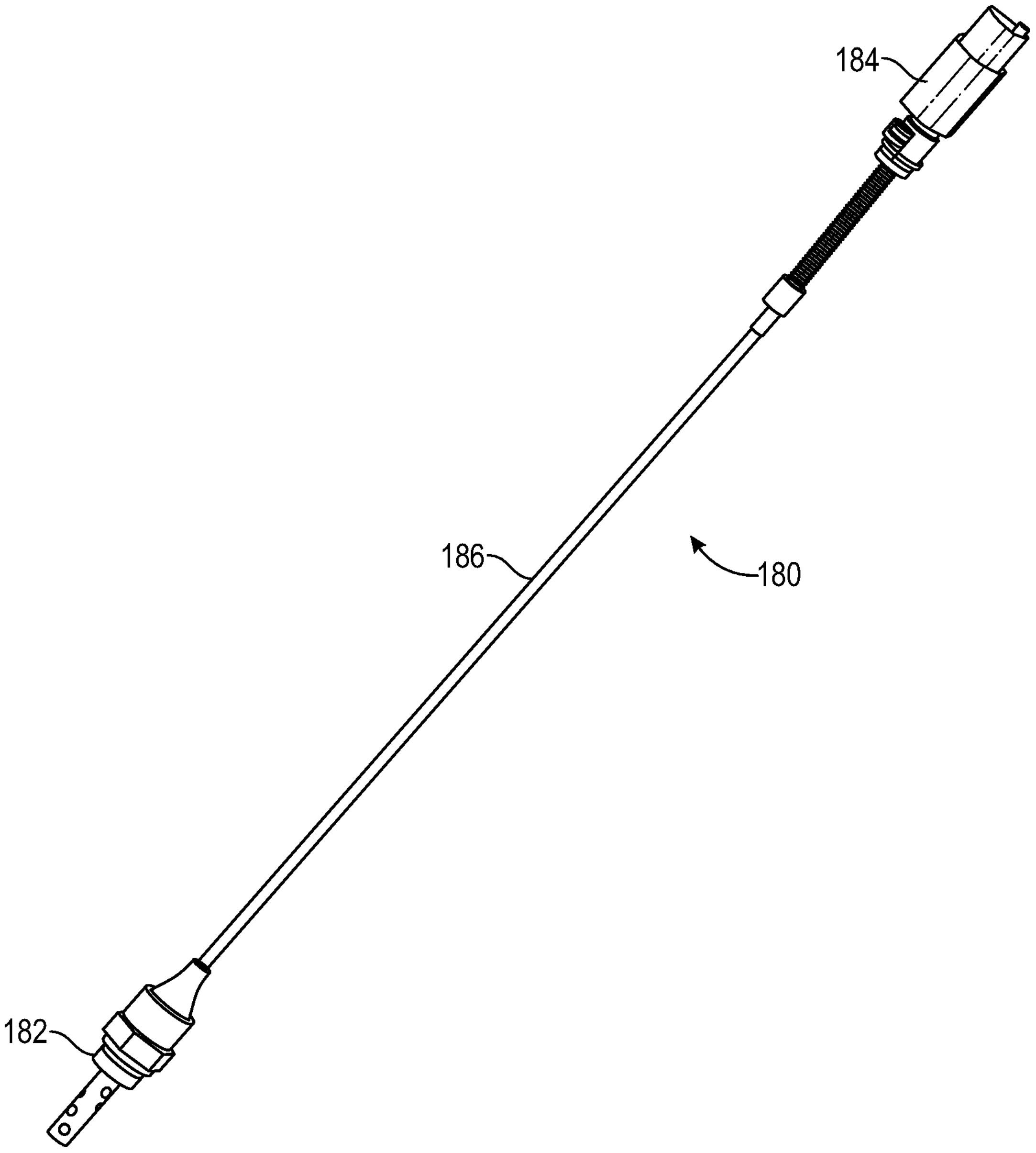
FIG. 5 is a perspective view of an embodiment of a fuel leak sensor usable with the fuel system covers of the present disclosure.

As shown in FIG. 5, fuel leak sensor 180 includes a sensor part 182 that is located within the chamber of fuel system cover 130', and a harness 184 connected to sensor part 182 with wiring 186. The wiring 186 extends away from fuel system cover 130' to harness 184. Harness 184 is connectable to a communication bus or other structure to provide output signals to an engine control unit (not shown) or other device that can provide an indication of a fuel leak in the chamber of fuel system cover 130'. Fuel leak sensor 180 could also be employed with fuel system cover 130, as shown in FIG. 1.

Figure 6:
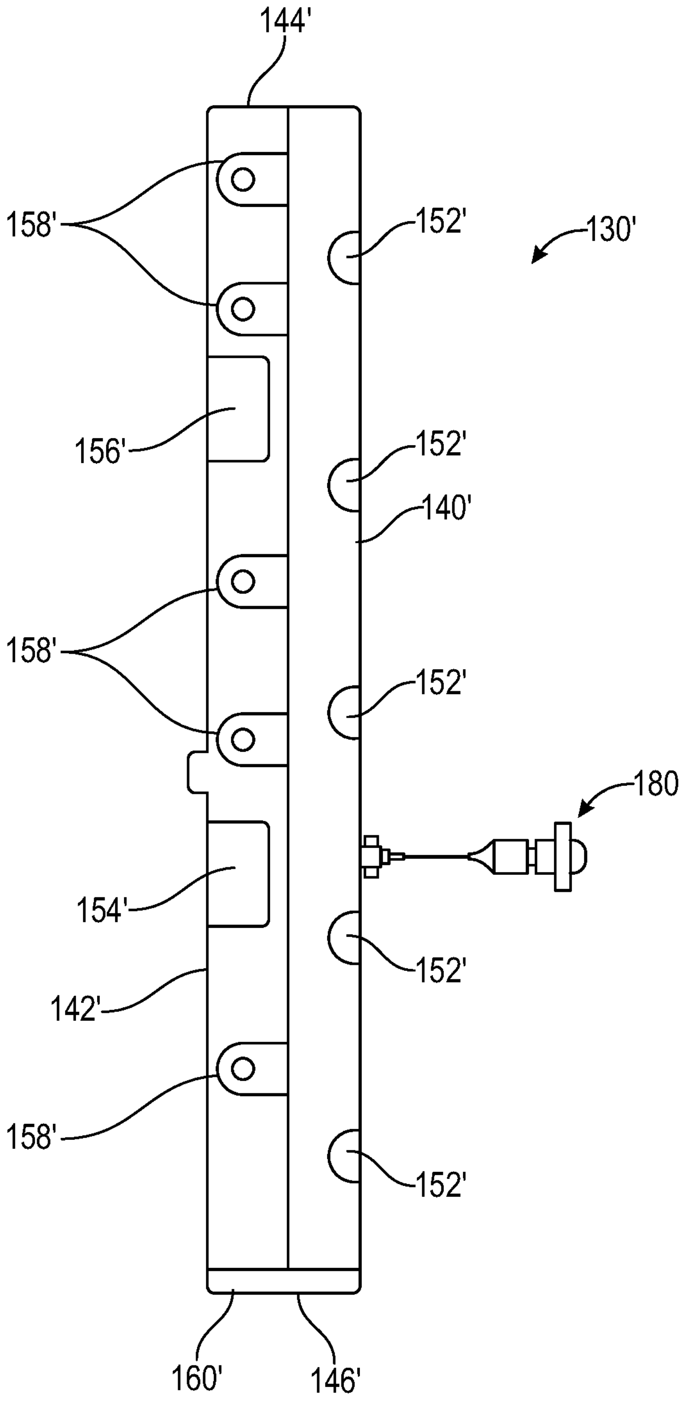
FIG. 6 is a top elevation view of the embodiment of the fuel system cover of FIG. 3.
Figure 7:
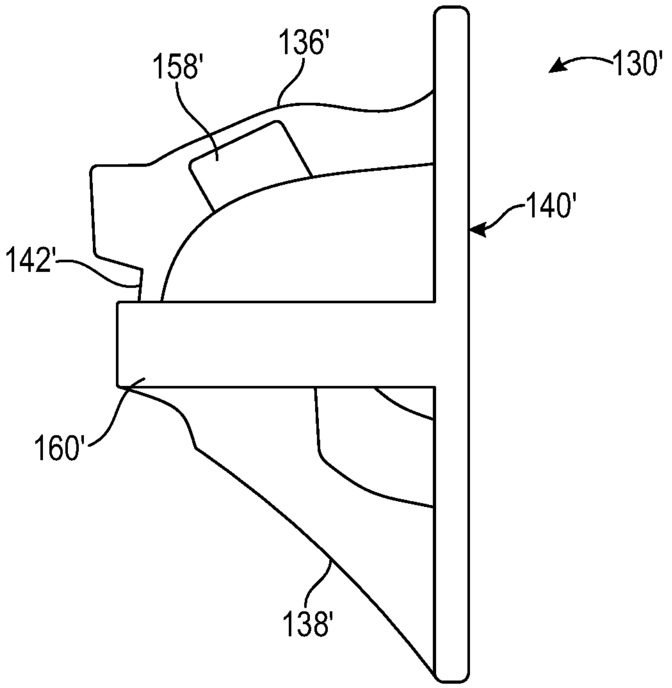
FIG. 7 is a back elevation view of the embodiment of the fuel system cover of FIG. 3.
Figure 8:
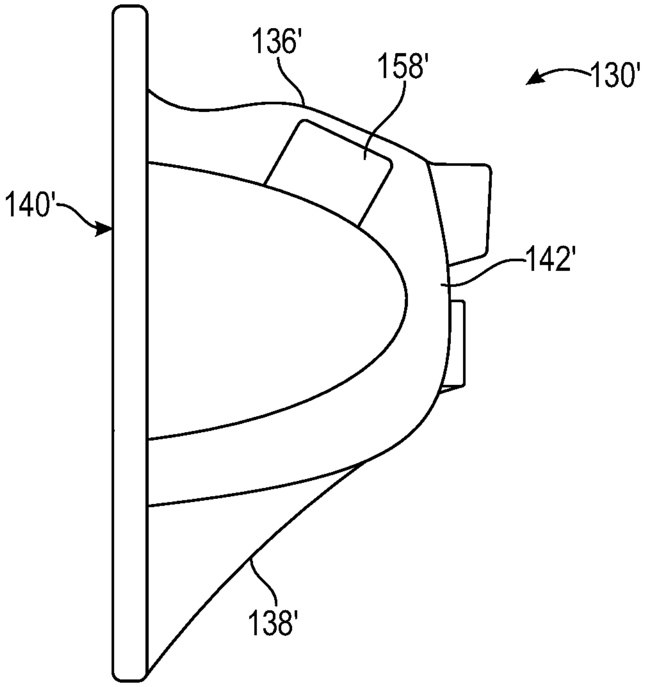
FIG. 8 is a front elevation view of the embodiment of the fuel system cover of FIG. 3.

FIGS. 6-8 show further views of the embodiment of fuel cover 130'. Fuel system cover 130' includes top wall 136' outwardly convexly rounded between opposite first and second side walls 140', 142'. Bottom wall 138' is sloped toward top wall 136' from first side wall 140' to second side wall 142'. Top wall 136', bottom wall 138', first side wall 140', and second side wall 142' extend between a front end wall 144' and an opposite rear end wall 146'. First side wall 140' defines an opening that is in communication with an interior chamber that houses the fuel system portion 170, such as discussed above with respect to fuel cover housing 130.

Rear end wall 146' is located toward flywheel 112 and the rearward end 122 of valve cover 110'. The first side wall 140' is positioned against the valve cover 110' and cylinder head 111'. Tabs 152' along the top of first side wall 140' can receive fasteners that secure the fuel cover housing 130' to valve cover 110'. Other fasteners 150 through second side wall 142', bottom wall 140', and/or end walls 144', 146' to engage fuel system cover 130' to cylinder head 111'. For example, rear end wall 146' can include a node 160' for receiving a fastener.

Second side wall 142' can include inset portions 154', 156' forming concave recesses in fuel system cover 130'. Inset portion 154' can include a bore to receive fuel leak sensor 180, and inset portion 156' can include a bore to receive fuel supply line 172. Second side wall 142' can also include a number of inspection ports 158'.

Various aspects of the present disclosure are contemplated as indicated in the claims appended hereto and as discussed above. According one aspect, an internal combustion engine system includes an internal combustion engine and a fuel system. The internal combustion engine includes a cylinder head assembly. The cylinder head assembly extends between a rearward end and an opposite forward end. The fuel system includes a portion extending externally along the cylinder head assembly. A fuel system cover is mounted to the cylinder head assembly. The fuel system cover encapsulates the portion of the fuel system extending externally along the cylinder head assembly.

In an embodiment, the rearward end of the cylinder head assembly is oriented toward a flywheel of the internal combustion engine, and the cylinder head assembly includes elongated opposite sides extending between the rearward end and the forward end, and the fuel system cover is mounted along one of the opposite sides of the cylinder head assembly. In a refinement of this embodiment, the fuel system cover is elongated and extends along an axis that parallels a rotational axis of the flywheel.

In an embodiment, the internal combustion engine system includes a sensor engaged to the fuel system cover. The sensor is configured to detect fuel within the fuel system cover. In an embodiment, the sensor includes a sensor part within the fuel system cover, and wiring extending from the sensor part away from the fuel system cover to a wiring harness.

In an embodiment, the fuel system cover includes a first side wall for mounting to the cylinder head assembly, an opposite second side wall, a top wall, and a bottom wall. The top and bottom walls extend between the first and second side walls. In a refinement of this embodiment, the fuel system cover includes a first end wall oriented toward the rearward end of the internal combustion engine and a second end wall oriented toward the forward end of the internal combustion engine, and the top and bottom walls and the first and second side walls extend between the first and second end walls. In a further refinement, the top wall is convexly rounded between the first and second side walls and the bottom wall is sloped toward the top wall from the first side wall to the second side wall.

In another refinement of the above embodiment, the first side wall forms an opening, and the opening is positioned along the cylinder head assembly. In a further refinement, the fuel system cover includes a chamber extending from the opening, and the portion of the fuel system is housed in the chamber.

In another refinement of the above embodiment, the second side wall includes a bore for receiving a fuel supply line that connects the portion of the fuel system encapsulated by the fuel system cover to a fuel supply.

In an embodiment, the cylinder head assembly includes a cylinder head mounted to the block and a valve cover mounted to the cylinder head, and the fuel system cover is engaged to at least one of the cylinder head and the valve cover. In a refinement of this embodiment, the fuel system cover is engaged to each of the cylinder head and the valve cover.

In an embodiment, the portion of the fuel system encapsulated by the fuel system cover includes a fuel rail extending along the cylinder head assembly.

According to another aspect of the present disclosure, a fuel system cover for a fuel system of an internal combustion engine is disclosed. The fuel system cover includes a housing defining an interior chamber configured to house at least part of a fuel system. The housing includes a first side wall forming an opening into the interior chamber. The first side wall is configured to mount to a cylinder head assembly of the internal combustion engine. The housing includes a second side wall opposite the first side wall, a top wall and an opposite bottom wall each extending between the first and second side walls, and a front end wall and an opposite rear end wall. The first and second side walls and the top and bottom walls each extend between the front and rear end walls.

In an embodiment, the second side wall includes a first inset portion with a first bore for receiving a fuel supply line therethrough. The second side wall also includes a second inset portion with a second bore for receiving a fuel leak sensor therethrough.

In an embodiment, the housing includes a plurality of tabs along a junction between the top wall and the first side wall. Each of the plurality of tabs includes a hole for fasteners. The fasteners engage the fuel system cover to a valve cover of the cylinder head assembly. In a refinement of this embodiment, the second side wall includes a plurality of holes for fasteners. The fasteners engage the fuel system cover to a cylinder head of the cylinder head assembly.

In an embodiment, a fuel leak sensor is mounted in the interior chamber of the housing. In an embodiment, the top wall is convexly rounded between the first and second side walls. The bottom wall is sloped toward the top wall from the first side wall to the second side wall.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as “a,” “an,” “at least one,” or “at least one portion” are used there is no intention to limit the claim to only one item unless specifically stated to the contrary in the claim. When the language “at least a portion” and/or “a portion” is used the item can include a portion and/or the entire item unless specifically stated to the contrary.

What is claimed is:

1. An internal combustion engine system, comprising:

an internal combustion engine including a cylinder head assembly, the cylinder head assembly including a valve cover extending between a rearward end and an opposite forward end;

a fuel system including a first portion extending externally along the valve cover of the cylinder head assembly and a second portion within the valve cover; and a fuel system cover mounted to the cylinder head assembly, the fuel system cover encapsulating the first portion of the fuel system extending externally along the valve cover of the cylinder head assembly, wherein the fuel system cover includes a first side wall forming an opening into an interior chamber that receives the first portion of the fuel system, the first side wall being mounted to a side of the cylinder head assembly of the internal combustion engine.

2. The internal combustion engine system of claim 1, wherein the rearward end of the cylinder head assembly is oriented toward a flywheel of the internal combustion engine, and the cylinder head assembly includes elongated opposite sides extending between the rearward end and the forward end, and the fuel system cover is mounted along one of the opposite sides of the cylinder head assembly.

3. The internal combustion engine system of claim 2, wherein the fuel system cover is elongated and extends along an axis that parallels a rotational axis of the flywheel.

4. The internal combustion engine system of claim 1, further comprising a sensor engaged to the fuel system cover, the sensor being configured to detect fuel within the fuel system cover.

5. The internal combustion engine system of claim 4, wherein the sensor includes a sensor part within the fuel system cover, and wiring extending from the sensor part away from the fuel system cover to a wiring harness.

6. The internal combustion engine system of claim 1, wherein the fuel system cover includes a second side wall opposite the first sidewall, a top wall, and a bottom wall, wherein the top and bottom walls extend between the first and second side walls.

7. The internal combustion engine system of claim 6, wherein the fuel system cover includes a first end wall oriented toward the rearward end of the internal combustion engine and a second end wall oriented toward the forward end of the internal combustion engine, and the top and bottom walls and the first and second side walls extend between the first and second end walls.

8. The internal combustion engine system of claim 7, wherein the top wall is convexly rounded between the first and second side walls and the bottom wall is sloped toward the top wall from the first side wall to the second side wall.

9. The internal combustion engine system of claim 6, wherein the opening is positioned along the cylinder head assembly.

10. The internal combustion engine system of claim 1, wherein the second side wall includes a bore for receiving a fuel supply line that connects the portion of the fuel system encapsulated by the fuel system cover to a fuel supply.

11. The internal combustion engine system of claim 1, wherein the cylinder head assembly includes a cylinder head mounted to the block and the valve cover is mounted to the cylinder head, and the fuel system cover is engaged to at least one of the cylinder head and the valve cover.

12. The internal combustion engine system of claim 11, wherein the fuel system cover is engaged to each of the cylinder head and the valve cover.

13. The internal combustion engine system of claim 1, wherein the portion of the fuel system encapsulated by the fuel system cover includes a fuel rail extending along the cylinder head assembly.

14. A fuel system cover for a fuel system of an internal combustion engine, the fuel system cover comprising:

a housing defining an interior chamber configured to house at least part of a fuel system, and the housing includes:

a first side wall forming an opening into the interior chamber, the first side wall being configured to mount to a side of a cylinder head assembly of the internal combustion engine;

a second side wall opposite the first side wall;

a top wall and an opposite bottom wall each extending between the first and second side walls; and a front end wall and an opposite rear end wall, wherein the first and second side walls and the top and bottom walls each extend between the front and rear end walls.

15. The fuel system cover of claim 14, wherein the second side wall includes:

a first inset portion with a first bore for receiving a fuel supply line therethrough; and a second inset portion with a second bore for receiving a fuel leak sensor therethrough.

16. The fuel system cover of claim 14, wherein the housing includes a plurality of tabs along a junction between the top wall and the first side wall, and the plurality of tabs each include a hole for a fastener, the fasteners engaging the fuel system cover to a valve cover of the cylinder head assembly.

17. The fuel system cover of claim 16, wherein the second side wall includes a plurality of holes for fasteners, the fasteners engaging the fuel system cover to a cylinder head of the cylinder head assembly.

18. The fuel system cover of claim 14, further comprising a fuel leak sensor mounted in the interior chamber of the housing.

19. The fuel system cover of claim 14, wherein:

the top wall is convexly rounded between the first and second side walls; and the bottom wall is sloped toward the top wall from the first side wall to the second side wall.

* * * * *